H. G. JOHNSTON.
THRUST BEARING.
APPLICATION FILED FEB. 6, 1912.
1,049,866.
Patented Jan. 7, 1913.
2 SHEETS—SHEET 2.
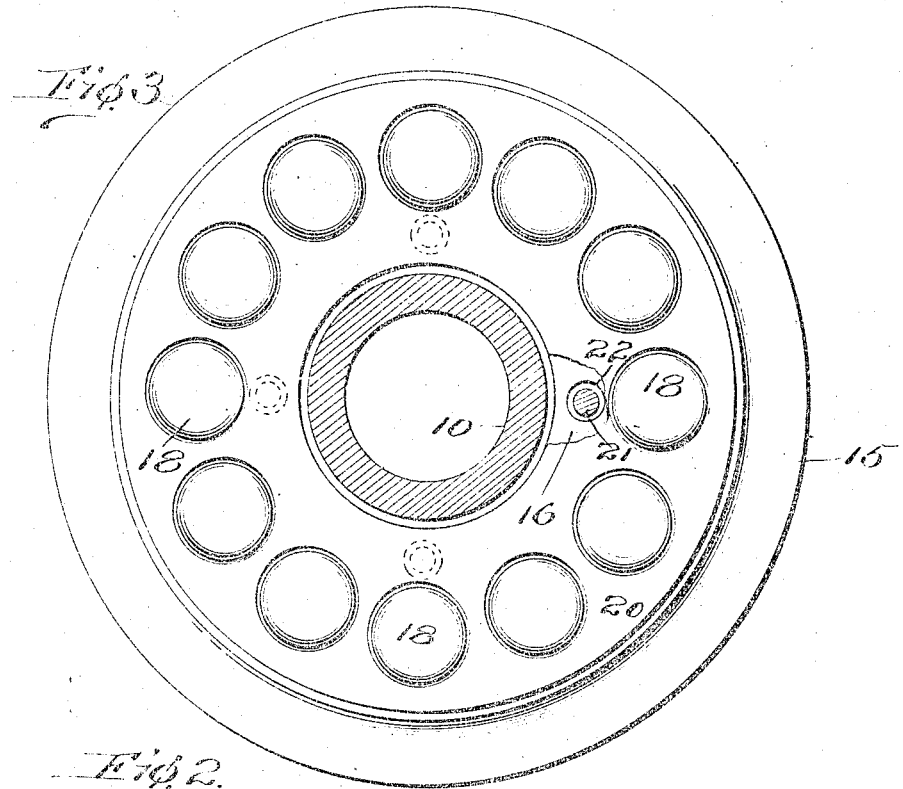
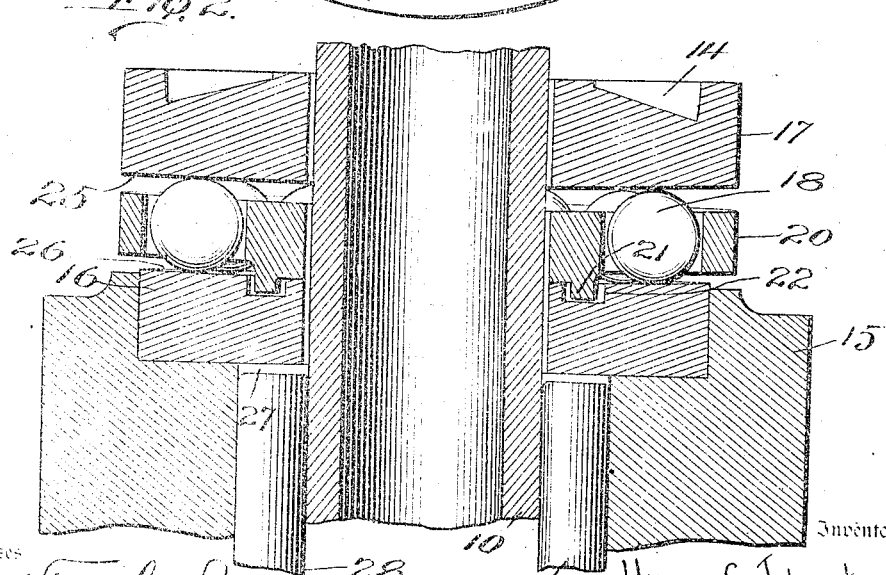

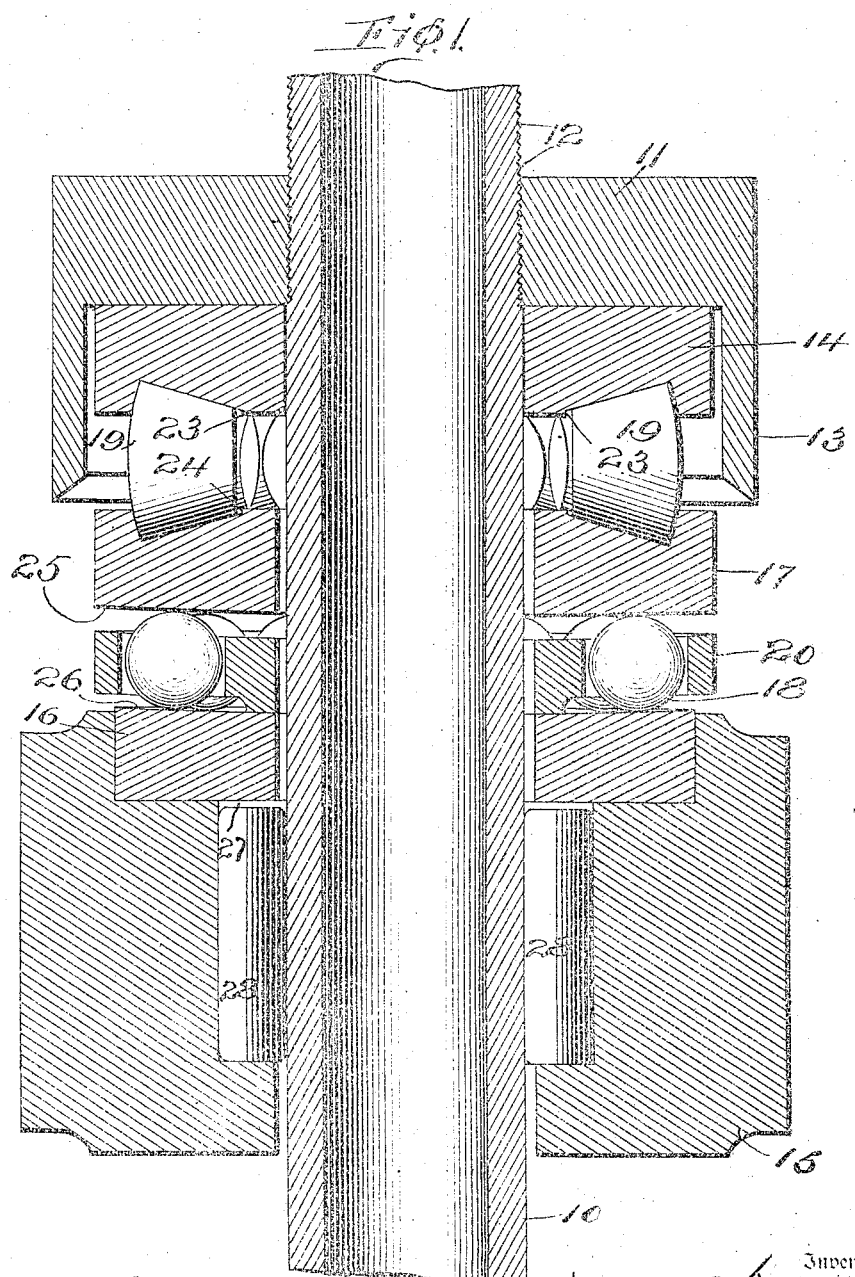

UNITED STATES PATENT OFFICE.

HORACE G. JOHNSTON, OF CORSICANA, TEXAS.

THRUST-BEARING.

1,049,866.  Specification of Letters Patent.  Patented Jan. 7, 1913.

Application filed February 6, 1912. Serial No. 675,358.

*To all whom it may concern:*

Be it known that I, HORACE G. JOHNSTON, a citizen of the United States, residing at Corsicana, in the county of Navarro and State of Texas, have invented certain new and useful Improvements in Thrust-Bearings; and I do hereby declare the following to be a full, clear, and exact description of the invention, such as will enable others skilled in the art to which it appertains to make and use the same.

This invention relates to thrust bearings and has for an object to provide a bearing of the ball, roller or cone type with improved means for equalizing the stress applied to and upon all of such antifriction members.

A further object of the invention is to provide between the fixed collars or race rings for the cone or ball bearings, a floating ring so constructed that when moved laterally it varies the thickness of that portion of such floating ring interposed between any given points of the fixed race rings.

A further object of the invention is to provide a race ring fixed to one member, as the moving member, carrying a race ring fixed to another member, as the stationary member, anti-friction means in engagement with both of said race rings and with a floating ring interposed between the two sets of antifriction devices adapted to move laterally to a limited extent to compensate for possible differences in the interval between such fixed race rings.

With these and other objects in view the invention comprises certain novel constructions, combinations and arrangement of parts as will be hereinafter more fully described and claimed.

In the drawings:—Figure 1 is a longitudinal, vertical, diametrical, sectional view through the improved bearing. Fig. 2 is a fragmentary, longitudinal, vertical, diametrical section, showing a slight modification in the arrangement of the ball cage in one of the fixed race rings. Fig. 3 is a top plan view of the ball cage with the balls in position, the center shaft being shown in section.

Like characters of reference indicate corresponding parts throughout the several views.

While the present thrust bearing is primarily intended for use in association with hydraulic swivels, such for instance as disclosed in applicant's Patent No. 12,732 reissued December 17th, 1907, or the patent of applicant and J. B. Norris No. 873,639 issued December 10th, 1907, it is to be understood that the use of such bearing is not limited to swivels but is adapted for any thrust bearing the axis of which is normally vertical.

As illustrated, the central shaft 10 is shown hollow to constitute the swivel stem of the hydraulic swivel when so employed. Upon such central shaft 10 a nut 11 is fixed preferably by the screw threads 12 although it will be understood that the manner of fixing said nut upon said shaft is wholly immaterial to the present invention. Also as shown, the nut 11 is provided with a downwardly extending flange or housing 13 within which is located the collar or race ring 14, it being understood that the flange 13 is only a protection against the introduction of dirt to the moving parts and is nonessential to the invention.

Below the nut 11 a member 15 is employed which is supported in any approved manner and from any source. The part 15 being termed an abutment is provided with a race ring 16 spaced from the race ring 14.

Between the race rings 14 and 16 a floating ring 17 is employed supported by means of balls 18 and in turn supporting cones 19 which also engage the under side of the race ring 14. The balls 18 are preferably retained in position by means of a cage 20 which may float freely, as indicated in the embodiment shown in Fig. 1, or which is retained against rotation by lugs 21 inserted into sockets 22 formed in the race 16 or in any approved manner to prevent the cage 20 from rotating while permitting it to move laterally to a limited extent.

The under side of the race ring 14 is provided with an annular furrow 23 slightly wider than the length of the cones 19 while the floating ring 17 is provided with a furrow 24 also slightly wider than the length of the cones 19 so that the ring 17 may move laterally, such lateral movement moving the cones at one side relative to the ring 14 while the cones at the opposite side remain stationary and the ring 17 moves relative to such rings.

The under side 25 of the floating ring 17 and the upper side 26 of the race ring 16 are formed as annular segments of a sphere, the surface of the ring 16 being concave while the surface of the floating ring 17 is convex.

In the use of thrust bearings with rollers, balls or cones interposed, absolute accuracy of machining is required to produce bearings which bear with equal stress upon all of the antifriction means, such a degree of nicety being essential as to make the practical construction of such a bearing almost an impossibility. Furthermore, in case the temper of the race rings varies, difference in wear is produced so that after using a short time the softer parts do not carry their share of the load imposed upon the antifriction means.

With the device as shown in the drawing, in case the space between the rings 14 and 16, for instance at the left side, is greater than that at the right, the differential pressure upon the right side will cause the floating ring 17 to move to the left, rolling upon the balls 18. This moving of the ring 17 to the left causes the left end of the ring 17 to move so that the ball at that end engages a thicker portion, both of such rings 17 and the supporting ring 16 whereby the ring 17 is lifted at the left side and lowered at the right side. Coincidentally, the cone at the right side is moved toward the left whereby it engages in the narrower portion of the furrows while the ring 17 moving to the left also forces such ring downwardly by reason of the inclination of the contacting surfaces of the furrows. It will thus be seen that whenever excess stress is applied to either side of the bearing, the floating ring 17 immediately moves toward the opposite side rolling laterally upon the balls 18 to constantly and at all times completely equalize the pressure upon all of the antifriction means, both the cones 19 and the balls 18.

It is wholly immaterial whether the ball cage 20 with the balls 18 rotate with or about the central shaft or whether they remain stationary, both actions being provided for in the disclosure. In the embodiment shown in Fig. 1 the balls 18 and cage 20 are free to rotate about the shaft 10 as an axis while at Fig. 2 the ball cage is held from rotation about the central shaft as an axis and is free to move to a limited extent only laterally or transversely relative to such shaft. The abutment 15 is also preferably chambered out as shown at 27 and rollers 28 carried therein which engage the periphery of the central shaft 10 to prevent its binding against the walls of the abutment. The ring 16 is seated in an annular chamber formed in the top of the abutment 15 and is removable to permit the insertion and removal of the rollers 28.

I claim:—

1. In a thrust bearing, a rotary shaft, a race ring carried by the shaft and provided with a conic furrow, a floating race ring having lateral movement with respect to the shaft arranged below said first-mentioned race ring and provided with a conic furrow complementary to the first-mentioned conic furrow, anti-friction cones positioned in said furrows, an abutment, a third race ring secured to the abutment below the second race ring and having a concave spherical surface adjacent thereto, said second race ring having a spherical convex lower surface, and a plurality of balls between said spherical concave and convex surfaces, whereby, when pressure is brought to bear upon one side a differential compensating movement is produced by the cones, the balls, and the floating ring.

2. In a thrust bearing, a rotatable shaft, an abutment surrounding said shaft, a race ring carried by the abutment having a spherically concave upper surface inclined downwardly toward the shaft, a second race ring disposed above said first ring provided with a spherical convex lower surface and an annular furrow in its upper surface spaced from the spherical concave surface of the first ring and free to move laterally of the shaft to a limited extent, a ball cage interposed between the rings and capable of lateral movement, balls within the cage and between the first and second rings, a third race ring carried by said shaft spaced above the second ring having an annular furrow in the under surface thereof, antifriction supporting cones engaging the furrows of the second and third rings of less length than said furrows to bind the cones in the furrows upon lateral movement of the middle ring.

3. In a thrust bearing, a rotatable shaft, an abutment surrounding said shaft, a race ring carried by the abutment having a spherically concave upper surface inclined downwardly toward the shaft, a second race ring disposed above said first ring provided with a spherical convex lower surface and an annular furrow in its upper surface spaced from the spherical concave surface of the first ring and free to move laterally of the shaft to a limited extent, a ball cage interposed between the rings and capable of lateral movement but held against rotary movement, balls within the cage and between the first and second rings, a third race ring carried by said shaft spaced above the second ring having an annular furrow in the under surface thereof, antifriction supporting cones engaging the furrows of the second and third rings of less length than said furrows to bind the cones in the furrows upon lateral movement of the middle ring.

In testimony whereof I affix my signature in presence of two witnesses.

HORACE G. JOHNSTON.

Witnesses:
L. L. MORRILL,
N. L. MEEM.